June 10, 1941.      C. G. SUITS      2,245,168
METHOD AND APPARATUS FOR TESTING
Filed Nov. 10, 1939
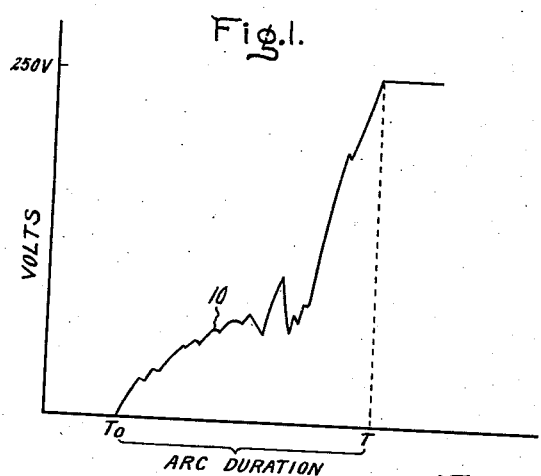
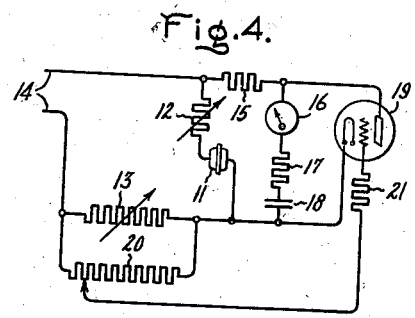
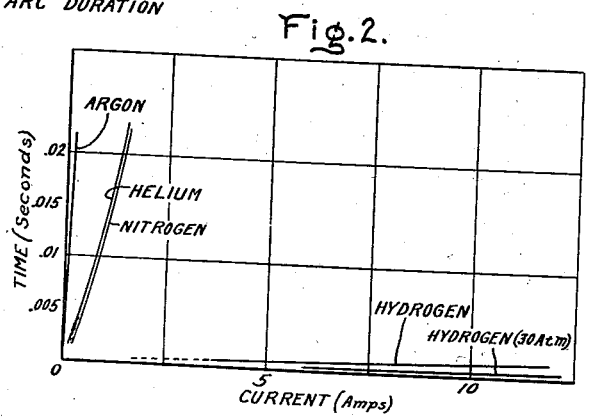
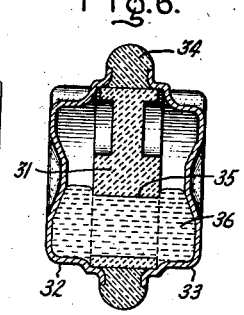
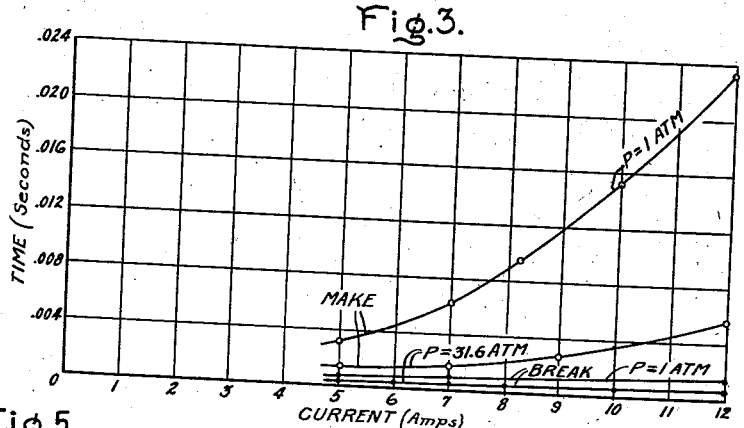
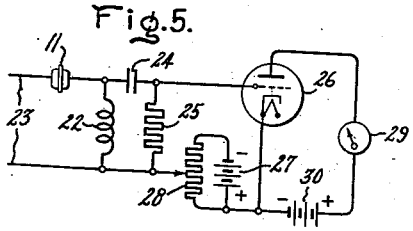
Inventor:
Chauncey G. Suits,
by Harry E. Dunham
His Attorney.

Patented June 10, 1941

2,245,168

UNITED STATES PATENT OFFICE 2,245,168

METHOD AND APPARATUS FOR TESTING

Chauncey G. Suits, Schenectady, N. Y., assignor to General Electric Company, a corporation of New York Application November 10, 1939, Serial No. 303,921

19 Claims. (Cl. 175—183)

This invention relates to testing methods and apparatus and has for its particular object the provision of an improved method and means for testing the quality of a gas. By the term "quality" it is intended to include such factors as the purity or pressure of the gas.

It is an important feature of my invention to utilize means for measuring a time-dependent characteristic of a transient arc produced upon completing or interrupting an electric circuit within a gaseous atmosphere under test. Among the arc characteristics which may be investigated in this connection are such factors as the total duration of the arc, the rate of change of current flowing through the arc during its existence, or the total amount of heat or light produced in the arc.

While not limited thereto, the invention is considered to be especially applicable in studying the quality of a gas enclosed within a sealed container, such as a sealed electrical device, where direct physical examination of the gas is impossible. Thus, the method and apparatus have been used with great success in testing mercury switches of the type which is formed entirely within a light-impervious container. Switches of this character frequently utilize hydrogen gas as an internal operating medium. The quality of such gas may readily be tested in accordance with the present method.

The features of my invention which I believe to be novel are set forth with particularity in the appended claims. My invention itself, together with further objects and advantages thereof, may best be understood by reference to the following description taken in conjunction with the accompanying drawing in which Fig. 1 shows a curve representing an electrical characteristic of an arc formed in a gas; Fig. 2 represents comparative electrical characteristics of arcs produced in several different gases; Fig. 3 represents comparative electrical characteristics of arcs produced in a particular gas at two different pressures; Fig. 4 represents a circuit embodying my invention; Fig. 5 represents a different embodiment of my invention; and Fig. 6 illustrates a switch upon which my invention may be practiced.

Referring to Fig. 1, the curve 10 represents the voltage, plotted against time, across the contacts of an electric switch interrupting a continuous current. When switch contacts carrying current are separated in a gaseous atmosphere, the voltage across the two contacts rises in a very irregular manner. This irregularity is due to the extreme instability of the arc produced between the contacts. In spite of the fact that such an arc is very unstable, it has been found that observations of the time of duration, and of certain other characteristics of the arc, when compared with check data taken under known conditions, provide a reliable measure of the quality of the atmosphere in which the arc is formed.

Check data of the character referred to is given in Figs. 2 and 3 of the drawing, this particular data being valid, of course, only for the special circuit conditions under which it was obtained. Additional charts may readily be prepared, however, for almost any other desired set of conditions.

Referring to Fig. 2, the several curves illustrate how the nature of the gas, in which a particular circuit is interrupted, affects the duration of the resulting arc. The curve marked "Argon" shows the relation between average arc duration in an argon atmosphere at about normal atmospheric pressure as the current interrupted is given different values. It is apparent that an arc in an atmosphere of argon persists for a relatively long time, even when small currents are being interrupted. The curves marked Helium, Nitrogen, Hydrogen, and Hydrogen (30 atmospheres) represent for each gas the variation in time required to interrupt a circuit as the current therein is changed. It is apparent from the figure that these atmospheres, as named, are capable of interrupting successively larger amounts of current in the same amount of time. Pure hydrogen at a pressure of 30 atmospheres is obviously a highly effective circuit-interrupting atmosphere.

Referring to Fig. 3, the four curves illustrate the difference in the ability of high and low pressure hydrogen to quench an arc. These curves were determined for a particular mercury switch of the enclosed type interrupting an electric circuit carrying various amounts of current, the switch being filled with pure hydrogen under carefully controlled conditions. It is significant that for currents greater than 5 amperes, the time required to complete the circuit with this switch (see the curves marked "Make") is considerably larger than the time required to interrupt corresponding currents. Although the reason is not clearly understood, it is probable that any switch forms a slight arc upon completing a circuit, due to burning away of small portions of contact surfaces which first carry current. In the particular mercury switch whose characteristics are represented by Figs. 1, 2 and 3, it seems probable that current flow is initiated through point contact between two mercury surfaces, so that burning and a consequent arc occurs at the point of contact.

The information given in the foregoing may be used in a practical way in testing the quality of a gaseous filling contained in a completely sealed container. For example, it has proven feasible by the use of a procedure shortly to be explained to test the gas tightness of hydrogen-filled mercury switches such, for example, as that illustrated in Fig. 6.

The switch referred to comprises a ceramic disk 31 and a pair of cylindrical metal shells 32 and 33, each having one end closed and an open end facing against the ceramic disk 31. The edges of the metal shells 32 and 33 are fused into a glass ring 34 at the periphery of the disk 31. A perforation 35 passes through the disk 31 to provide communication between the two chambers formed by the shells 32 and 33. A body of mercury 36 is illustrated in the lower portion of the switch. Pure hydrogen at high pressure is introduced inside the metal shells. The mercury is of sufficient volume so that, when the disk 31 is turned so that the perforation 35 is at a low position, a circuit is completed from the member 33 through the mercury 36 to the member 32.

It is obvious that the completely sealed character of the switch makes it impossible to test its gaseous content by ordinary analytical methods. However, in accordance with my present invention, such a test may be readily made by determining a characteristic of the arc formed in the switch by causing the mercury to make or break an electrical circuit.

Referring to Fig. 4, there is shown a simple circuit suitable for measuring a particular time-dependent characteristic of the arc resulting from interruption of an electrical circuit by a switch 11, which may be assumed to correspond to the switch illustrated by Fig. 6. This switch 11 is connected in series with a variable resistor 12, a second variable resistor 13, and two wires 14, to which is connected a suitable source of continuous current. Adjustment of the load resistor 13 or the voltage of the source of current controls the amount of current which the switch 11 interrupts. A meter circuit, connected in shunt to the switch 11 and resistor 13, includes serially a resistor 15, an integrating meter, such as a ballistic galvanometer 16, a resistor 17, and a condenser 18. Means is provided for limiting application to the meter 16 of the voltage across the switch 11 to the duration of the arc. This means comprises a vapor electric discharge device 19, the anode of which is connected to a point of the circuit between the galvanometer 16 and the resistor 15. The cathode of the device 19 is connected between the condenser 18 and the switch 11. The control electrode of the device 19 is controlled in potential by a connection through a resistor 21 to the adjustable tap of a voltage dividing resistor 20, which is connected in shunt to the resistor 13. The device 19, the condenser 18 and the switch 11 cooperate to produce current flow through the galvanometer 16 only during existence of an arc in the switch. When the switch 11 is opened, the voltage drop across the resistor 13 remains sufficiently large to prevent the device 19 from becoming conductive until the current through the resistor 13 has nearly reached zero. Since the resistor 12 is small, substantially the whole arc voltage across the contacts of the switch 11 is applied across the resistors 15 and 17, the galvanometer 16, and the condenser 18. Current can flow through the condenser 18 only while voltage exists across the arc between the contacts of the switch 11. Upon opening the switch 11 the voltage thereacross begins to increase and current begins to flow to the condenser 18 to charge it. As the current through the resistor 13 approaches zero, the cathode of the device 19 becomes sufficiently negative with respect to its control electrode so that the device 19 becomes conductive. This action occurs substantially at the time when the arc is extinguished, and acts to terminate the flow of charging current to the condenser 18, which is assumed to be of sufficient capacity to assure that it shall be incompletely charged at the termination of the arc. As a result of these considerations, the amount of charge on the condenser and consequently the maximum deflection of the galvanometer needle is a direct measure of the voltage across the arc integrated with respect to time throughout the duration of the arc.

The device 19 is not capable of reducing the voltage across the galvanometer 16, resistor 17, and condenser 18 entirely to zero. If the device 19 is of the mercury vapor discharge type, there is a drop of approximately 10 volts through it while it is conductive. In order to prevent this residual potential drop from making the final zero point setting of the meter differ from the initial zero setting, the resistor 12 is adjusted so that there is an equal potential drop across it while the switch 11 is conducting current. Therefore, the initial charge of the condenser 18, due to the voltage drop across the resistor 12, is equal to the final charge thereof, due to the potential drop through the device 19.

The galvanometer reading which has been obtained for the switch under test may then be compared with a value previously obtained for a switch having a gas filling of desired quality. By this means, one may determine whether the gas filling of the switch under test is below the intended or normal pressure, or whether it is becoming contaminated by admixture with a harmful impurity. Imperfect or sub-normal switches may then be rejected by the operator.

Since an arc formed in a gas is very unstable in character, it has been found that better results in testing atmospheres by the present procedure have been obtained by measuring the average of a similar time-dependent character for a number of arcs. This procedure should, of course, be used both in measuring the arc characteristic of a switch with a desired gas filling and the characteristic of switches which are later compared with it for testing purposes.

Referring to Fig. 5, a different circuit is shown for measuring a time-dependent characteristic of the switch 11. In this circuit the switch is connected in series with an inductance 22 and a pair of wires 23. The wires 23 are connected to a suitable source of potential which is preferably continuous. Upon opening or closing the switch 11 a momentary high voltage is produced across the inductance 22, whose value is proportional to the rate of change of current.

To measure the peak value of this voltage a peak voltmeter is connected to be energized by the voltage across the inductance 22. Such a voltmeter may include a serially connected condenser 24 and resistor 25 in shunt to the inductance 22, a three-electrode vacuum tube 26, and a current indicating meter 29. The control electrode of the tube 26 is connected between the condenser 24 and the resistor 25. The positive terminal of a source of potential 27 is connected to the cathode of the device 26 and the source 27 is shunted by a calibrated voltage dividing resistor 28. The variable tap of the resistor 28 is connected between the resistor 25 and the inductance 22. The meter 29 and a source of anode potential 30 are connected in series between the anode and cathode of the device 26.

When the switch 11 is repeatedly opened or closed, a high momentary voltage is induced in the inductance 22 at each operation and, if the voltage applied to the wires 23 is of proper polarity, the potential on the control electrode of the device 26 becomes sufficiently positive so that it carries current for brief intervals of time. The device 26 is normally biased by adjustment of the tap on resistor 28 to the point at which it just begins to carry current at the time of highest voltage across the inductance 22. Observation of this point (as indicated for example on an appropriately calibrated scale associated with the resistor) gives a direct indication of the peak value of the voltage in question.

In a given gas the speed with which the arc in the switch is extinguished, and hence the rate of change of the arc current, will be greater the higher the gas pressure. Consequently, the higher the gas pressure, the greater will be the bias voltage which must be applied to the grid through the agency of the resistor 28 to prevent conduction by the device 26 and the higher will be the reading of the resistor scale. Similarly, for different gases at the same pressure the speed with which the arc in the switch 11 is extinguished will depend upon the nature of the gas in the same order as shown for the gases argon, helium, nitrogen, and hydrogen in Fig. 2. Thus the rate of change of current flow through the arc, as indicated by the devices 26, 28, and 29, is a measure of the purity and pressure of gas within the switch element 11.

While the method and apparatus of my invention have been described in connection with a particular type of mercury switch, it is to be understood that they are not actually so limited, but that the quality of the atmosphere in any enclosure containing any type of circuit-interrupting means may be tested by the means described. Substantially the same relationship between arcing characteristics and gaseous content have been observed in switches using solid contacts as have been described above in connection with liquid contact devices.

Reference has been made to several time-dependent characteristics of the arc in a switch which may be measured in the use of my invention, including the duration of the arc, the rate of change of current flowing through the arc during its existence, the voltage across the arc integrated with respect to time, and the total amount of heat or light produced in the arc. I wish it to be understood that other time-dependent characteristics may be measured, such for example, as the total energy consumed by the arc during its existence. Comparison of a total energy measurement, taken upon a switch under test, with check data determined as normal by a suitable procedure, is especially useful in determining the quality of gas filling the switch under test, since the energy released in the arc between switch contacts is a direct cause of switch failure.

While I have shown particular embodiments of my invention and a particular use of my method, it will, of course, be understood that I do not wish to be limited thereto, since different modifications may be made both in the circuit arrangements and instrumentalities and in the method employed, and I aim by the appended claims to cover any such modifications as fall within the true spirit and scope of my invention.

What I claim as new and desire to secure by Letters Patent of the United States, is:

1. The method of testing the quality of a gaseous atmosphere, which comprises creating an arc in said atmosphere, and measuring a time-dependent characteristic of the arc.

2. The method of testing the quality of a gaseous atmosphere, which comprises creating a transient arc in said atmosphere, and measuring a factor dependent on the time of duration of the arc.

3. The method of testing the quality of a gaseous atmosphere, which comprises creating an electric arc in said atmosphere, and measuring a factor dependent on the amount of energy consumed in the arc in the course of its duration.

4. The method of testing the quality of a gaseous atmosphere, which comprises creating an electric arc in said atmosphere, and measuring an electrical quantity of said arc, the value of which is dependent on time.

5. The method of testing the quality of a gaseous atmosphere, which comprises creating a transient electric arc in said atmosphere, and measuring a factor dependent on the rate of change of current flowing through said arc during its existence.

6. The method of testing the quality of a gaseous atmosphere, which comprises creating an electric arc in said atmosphere, and measuring a factor dependent upon the voltage, integrated with respect to time, across said arc during its existence.

7. The method of testing the quality of a gaseous atmosphere, which comprises creating a number of arcs in said atmosphere, measuring similar time-dependent characteristics of the various arcs and determining the average value of said characteristics to indicate the quality of said atmosphere.

8. The method of testing the quality of a gaseous medium confined within an enclosure which contains conductive contact-making and -breaking elements, which comprises applying voltage between said elements, moving said elements to establish an arc between them, and measuring a time-dependent characteristic of the arc.

9. The combination in apparatus for testing the quality of a gaseous atmosphere, of means for creating an arc in said atmosphere, and means for measuring a time-dependent characteristic of said arc.

10. The combination in apparatus for testing the quality of a gaseous atmosphere, of means for creating an arc in said atmosphere, and means for measuring a factor dependent on the time of duration of said arc.

11. The combination in apparatus for testing the quality of a gaseous atmosphere, of means for creating an electric arc in said atmosphere, and means for measuring a factor dependent on the amount of energy consumed in the arc in the course of its duration.

12. The combination in apparatus for testing the quality of a gaseous atmosphere, of means for creating an electric arc in said atmosphere, and means for measuring an electrical quality of said arc, the value of which is dependent on time.

13. The combination in apparatus for testing the quality of a gaseous atmosphere, of means for creating an electric arc in said atmosphere, and means for measuring a factor dependent upon the rate of change of the current in said arc.

14. The combination in apparatus for testing the quality of a gaseous atmosphere, of means for creating an electric arc in said atmosphere, and means for measuring a factor dependent upon the voltage across said arc, integrated with respect to time.

15. The combination in apparatus for testing the quality of a gaseous atmosphere, of means for creating a number of arcs in said atmosphere, and means for measuring similar time-dependent characteristics of said arcs.

16. Apparatus for testing the quality of a gaseous medium within an enclosure which contains conductive contact-making and -breaking elements, which apparatus comprises means for applying voltage between said elements, means for moving said elements to establish an arc between them, and means for measuring a time-dependent characteristic of said arc.

17. The combination in apparatus for testing the quality of a gaseous atmosphere, of means for creating a transient electric arc in said atmosphere, and means for measuring a factor dependent upon the voltage across said arc integrated with respect to time for the duration of the arc, said last means comprising an integrating meter connected in shunt with said arc, and means for limiting application of voltage to said meter to the duration of the arc.

18. The combination in apparatus for testing the quality of a gaseous atmosphere, of means for creating an electric arc in said atmosphere, and means for measuring a factor dependent on the rate of change of current through said arc, said last means comprising an inductance for supplying current to said first means, and means for measuring the voltage across said inductance upon creation of an arc.

19. The method of testing the quality of a gaseous atmosphere, which comprises creating an arc in said atmosphere, measuring a time dependent characteristic of the arc, and comparing the measured characteristic with a similar time dependent characteristic of an arc created in an atmosphere of known quality.

CHAUNCEY G. SUITS.